United States Patent [19]

Harada et al.

[11] Patent Number: 5,064,609

[45] Date of Patent: Nov. 12, 1991

[54] METHOD OF SINTERING A SINTERABLE METAL POWDER HONEYCOMB MONOLITH STRUCTURE

[75] Inventors: Takashi Harada, Nagoya; Tsuneaki Ohashi, Ohgaki, both of Japan

[73] Assignee: NGK Insulators, Ltd., Japan

[21] Appl. No.: 545,655

[22] Filed: Jun. 29, 1990

[30] Foreign Application Priority Data

Apr. 12, 1990 [JP] Japan ..................................... 2-96867

[51] Int. Cl.⁵ ................................................ B22F 3/00
[52] U.S. Cl. .......................................... 419/58; 419/36; 419/37; 419/38; 419/41
[58] Field of Search ...................... 419/36, 37, 38, 41, 419/58

[56] References Cited

U.S. PATENT DOCUMENTS

| | | | |
|---|---|---|---|
| 4,492,669 | 1/1985 | Gould | 419/5 |
| 4,582,677 | 4/1986 | Sugino et al. | 419/2 |
| 4,758,272 | 7/1988 | Pierotti et al. | 75/246 |
| 4,871,621 | 10/1989 | Bagley et al. | 428/549 |

FOREIGN PATENT DOCUMENTS 57-6974  2/1982  Japan .

Primary Examiner—Stephen J. Lechert, Jr.
Assistant Examiner—Leon Nigohosian, Jr.
Attorney, Agent, or Firm—Parkhurst, Wendel & Rossi

[57] ABSTRACT

A method of sintering a sinterable metal powder honeycomb monolith structure comprises sintering the honeycomb monolith structure in a reducing atmosphere containing hydrogen. The honeycomb monolith structure is encased in a sintering jig and thereby disposed close to or in contact with the sintering jig.

5 Claims, 2 Drawing Sheets

METHOD OF SINTERING A SINTERABLE METAL POWDER HONEYCOMB MONOLITH STRUCTURE

BACKGROUND OF THE INVENTION

1. Field of the Invention

The present invention relates to a method of sintering a sinterable metal powder honeycomb monolith structure which comprises sintering a sinterable metal powder honeycomb monolith, obtained by forming metal powders into a unitary honeycomb monolith structure, in a reducing atmosphere containing hydrogen.

2. Description of the Related Art

Conventionally, porous ceramic honeycomb structures have been employed as catalysts for removing nitrogen oxides and so on present in the exhaust gas of internal combustion engines, such as automobiles, or catalyst carriers.

In recent years, metal honeycomb structures exhibiting greater mechanical strength and thermal resistance in hostile environments have also been manufactured. Such metal honeycomb structures are manufactured by forming metal powders into a honeycomb structure and by sintering the formed honeycomb structure.

In the manufacture of ceramic or metal honeycomb monolith structures of the type described above, sintering of sinterable ceramic or metal powder honeycomb monolith structures (formed bodies) is conventionally performed in a reducing atmosphere by an electric furnace or the like in a state where the formed bodies are placed adequately in the electric furnace or the like.

However, such a sintering method cannot provide complete metallization of the outer surface of the metal honeycomb structures, thereby causing non-uniform shrinkage of the honeycomb structures during sintering, which may lead to deformation of the final products.

SUMMARY OF THE INVENTION

The present inventors made various studies and found that the aforementioned problem associated with the sintering of the sinterable metal powder honeycomb structures can be solved by sintering the sinterable monolith structure in a state in which they are located adjacent to or in contact with a sintering jig. The present invention is based on that finding.

That is, the present invention provides a method of sintering a sinterable metal powder honeycomb monolith structure in a reducing atmosphere containing hydrogen wherein the sinterable metal powder honeycomb monolith structure is sintered in a state in which it is encased in a sintering jig and thereby disposed close to or in contact with the sintering jig.

In the preferred form of the present invention, the sinterable structure is sintered in a state in which it is encased in a sintering jig and thereby disposed at a position separated by at most 30 mm from the jig.

DETAILED DESCRIPTION OF THE INVENTION

In the present invention, when a sinterable metal powder honeycomb monolith structure is to be sintered, the sinterable body is encased in a sintering jig and thereby disposed close to or in contact with the jig.

In this case, each of a plurality of honeycomb monolith structures may be disposed close to or in contact with the jig.

The function of the provision of the sintering jig is not yet clarified. It is, however, estimated that the sintering jig provides some atmosphere and serves as a getter for impurities present in the employed atmosphere or generates radiant heat.

The sintering jig employed in the present invention can be made of any material. Examples of such materials include metals, such as stainless steel, Mo and W, and ceramics, such as alumina, graphite and SiC.

Figure 3:
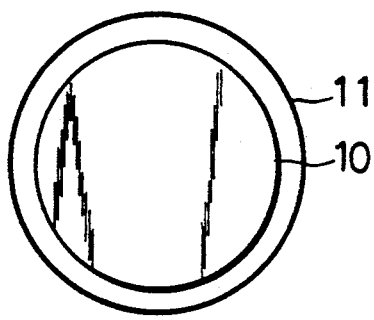
FIG. 3 to FIG. 5 are plan views showing various states in which a sinterable body is encased in a sintering jig.
Figure 4:
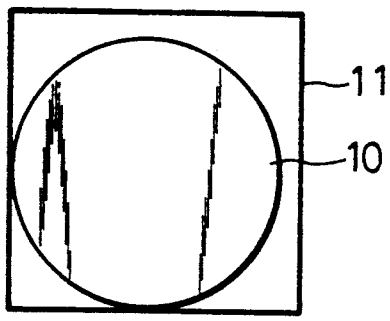
Figure 5:
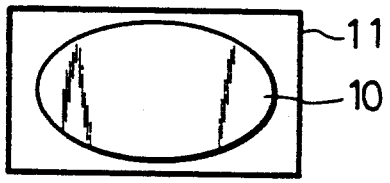

Generally, the sintering jig is a cylindrical body to be placed in a sintering furnace in such a manner that it encases the side portion of a sinterable metal powder honeycomb monolith structure. For example, as shown in FIG. 3, FIG. 4 and FIG. 5, a honeycomb monolith structure 10 is encased in a sintering jig 11. The honeycomb monolith structure 10 may be circular in cross-sectional form (FIGS. 3 and 4), and may be oval in cross-sectional form (FIG. 5). In FIG. 4, the honeycomb monolith structure 10 is disposed in contact with two sides of the sintering jig 11. Alternatively, the sintering jig may be such a cylindrical body with a lid which does not completely close the cylindrical body.

The sintering atmosphere employed in the present invention is a reducing atmosphere containing, in addition to hydrogen, any type of gas that does not react with the sinterable body, such as $N_2$, Ar, CO, $CO_2$, He or hydrocarbon.

The preferred proportion of hydrogen in the sintering atmosphere is 5% by volume or above with more preferred level being 25% by volume or above.

There is no limitation to the structural components and composition of the sinterable metal powder honeycomb monolith structure to be sintered in the present invention. Examples of the structural components include Fe, Cr, Al, Ni, W, Co, Mo, Ta and various alloys of these metals.

Fe or the like sintered in a reducing atmosphere containing hydrogen acts as a catalyst of an organic binder, allowing the organic binder to be decomposed and thereby removed. As a result, burning out of the binder and sintering can be performed succesively.

The sinterable metal powder honeycomb monolith structure can have any honeycomb configuration. However, in a honeycomb monolith structure designed for use as a catalyst carrier or a catalytic converter, the cell density will be held between 6 to 1500 cells/in$^2$ (0.9 to 233 cells/cm$^2$). The preferred wall thickness of the cells is between 50 and 2000 μm.

Figure 6:
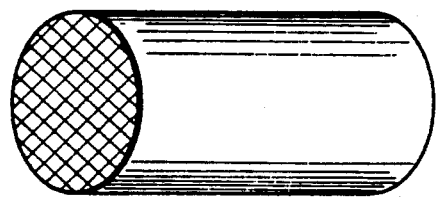
FIG. 6 is a perspective view showing an example of a honeycomb monolith structure.

The term, "honeycomb monolith" is employed in this application to refer to an integral body having a large number of passages partitioned by the walls, as shown in FIG. 6. The passages may have any cross-sectional form (cell form), e.g., a circular, polygonal or corrugated form.

The present invention will further be illustrated in the following examples which are intended to be illustrative, but not limiting, of this invention.

EXAMPLE 1

Figure 1:
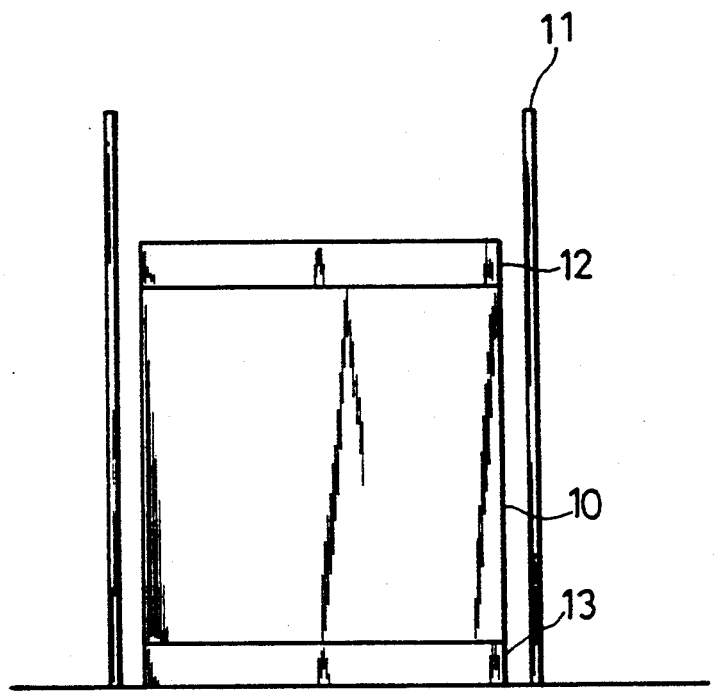
FIG. 1 is a cross-section showing a state in which a sinterable body is encased in a sintering jig.

A mixture of Fe powder, Cr powder, Ni powder and Al powder, or powders of alloys of these metals (containing stainless steel powder), were blended into an organic binder, a lubricant and water to prepare admixtures having compositions of Fe-18Cr-8Ni, Fe-22Cr-5Al and Fe-25Al. Each of these admixtures was then extruded through a die to form a square cell honeycomb monolith structure having a wall thickness of 100 μm, a cell density (passage density) of 62/cm$^2$, a diameter of 100 mmφ, and a length of 100 mm. After the shaped honeycomb monolith structure 10 was dried, it was sintered at 1200° C. in an atmosphere consisting of 50% by volume of hydrogen having a purity of 99.9% or above and 50% by volume of argon having a purity of 99.9% or above in a state in which it was located in a stainless steel casing 11 having an inner diameter of 105 mmφ and a height of 150 mm, as shown in FIG. 1. In FIG. 1, reference numerals 12 and 13 respectively denote an upper setter and a lower setter of a honeycomb structure.

Metallic luster of the surface of the obtained sintered bodies and distortion of the obtained sintered bodies were observed and measured. Table 1 shows the results of the observation and measurements.

As can be seen from Table 1, the surface of the sintered bodies obtained had metallic luster and no deformation occurred.

TABLE 1

| Composition | Fe—18Cr—8Ni | Fe—22Cr—5Al | Fe—25Al |
| --- | --- | --- | --- |
| Stainless steel casing | used | used | used |
| Metallic luster on the surface of sintered body | yes | yes | yes |
| Degree of deformation* (mm) | | | |
| Upper end surface - Central portion | 0 | 0 | 0 |
| Central portion - Lower end surface | 0 | 0 | 0 |
| Upper end surface - Lower end surface | 0 | 0 | 0 |

*Difference in diameter of the respective portions

EXAMPLE 2

Sinterable honeycomb structure having a composition of Fe-22Cr-5Al were sintered in the same manner as that of Example 1 in a state in which they were located in a stainless steel, molybdenum, alumina and graphite casings, respectively.

The obtained sintered bodies were observed and measured in the same manner as that of Example 1. Table 2 shows the results thereof.

For comparison, the same observation and measurement were conducted on the sintered body obtained by the sintering in which the sinterable honeycomb structure was not located in a casing. The results are also shown in Table 2.

As is clear from Table 2, sintering conducted in a state wherein the sinterable honeycomb structures are located in various casings ensures the sintered bodies whose surface has metallic luster and which are not deformed, whereas sintering performed in a state where the sinterable honeycomb structures are not located in a casing provides sintered bodies whose surface has no metallic luster and which are deformed.

TABLE 2

| Composition Sintering jig (Casing) | Fe—22Cr—5Al | | | | |
| --- | --- | --- | --- | --- | --- |
| | Stainless steel | Molybdenum | Alumina | Graphite | No sintering jig |
| Metallic luster on the surface of sintered body | yes | yes | yes | yes | no |
| Degree of deformation* (mm) | | | | | |
| Upper end surface - Central portion | 0 | 0 | 0 | 0 | 6 |
| Central portion - Lower end surface | 0 | 0 | 0 | 0 | 5 |
| Upper end surface Lower end surface | 0 | 0 | 0 | 0 | 1 |

*Difference in diameter of the respective portions

EXAMPLE 3

Figure 2:
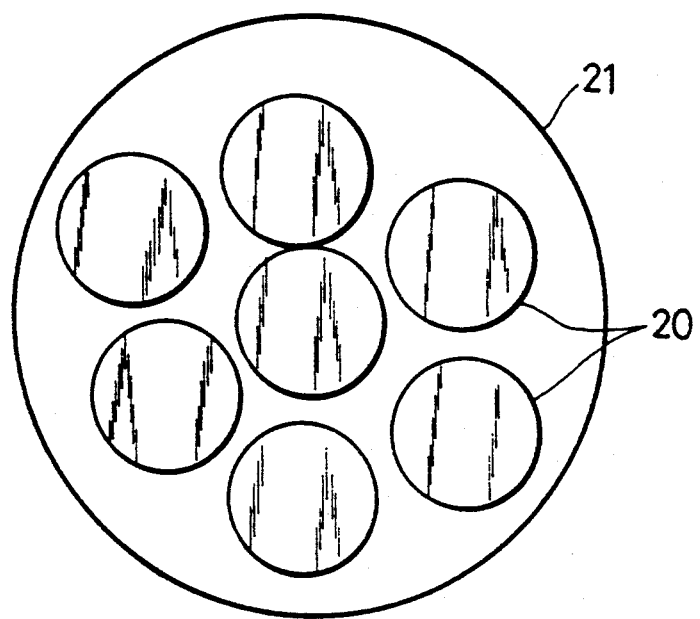
FIG. 2 is a plan view showing a state in which a plurality of sinterable bodies are encased in a sintering jig.

Sinterable honeycomb monolith structure, having a diameter of 25 mmφ and a length of 50 mm, whose composition was Fe-22Cr-5Al, were produced in the same manner as that of Example 1, and the obtained honeycomb monolith structures 20 were then sintered in the same manner as that of Example 1 in a state in which they were located in a stainless steel sintering jig 21 having an inner diameter of 105 mmφ and a height of 150 mm, as shown in FIG. 2.

At that time, the honeycomb monolith structures 20 were in contact with or separated from other honeycomb monolith structures or the stainless steel casing 21 at most by 20 mm.

The obtained sintered bodies were observed and measured in the same manner as that of Example 1. No deformation occurred in any honeycomb monolith structure, and the surface of all the honeycomb monolith structures had metallic luster.

EXAMPLE 4

The sinterable honeycomb monolith structures prepared in the same manner as that of Example 1 were sintered in the same manner as that of Example 1 in a state in which they were located in stainless steel casings respectively having inner diameters of 120 mmφ, 160 mmφ and 180 mmφ. The obtained sintered bodies were observed and measured in the same manner as that of Example 1. Table 3 shows the results of the observation and measurements.

As can be seen from Table 3, the surface of the sintered bodies obtained using a casing having an inner diameter equal to or less than 160 mmφ had metallic luster and those sintered bodies had no deformation.

The surface of the sintered body obtained using a casing having an inner diameter of 180 mmφ had no metallic luster and deformation occurred in that sintered body, as in the case of the sintered body obtained using no casing.

TABLE 3

| Composition Sintering jig (Casing) | F—22Cr—5Al | | Stainless steel |
|---|---|---|---|
| Inner diameter of the casing (mm) | 120 | 160 | 180 |
| Metallic luster on the surface of sintered body | yes | yes | no |
| Degree of deformation* (mm) | | | |
| Upper end surface - Central portion | 0 | 0 | 3 |
| Central portion - Lower end surface | 0 | 0 | 2 |
| Upper end surface - Lower end surface | 0 | 0 | 1 |

*Difference in diameter of the respective portions

As will be understood from the foregoing description, according to the sintering method of the present invention, since sinterable metal powder honeycomb monolith structures are sintered in a state in which they are located close to or in contact with a sintering jig, the obtained sintered bodies has a surface having metallic luster and are not deformed.

What is claimed is:

1. A method of sintering a sinterable metal powder honeycomb monolith structure, comprising:
   sintering said sinterable metal powder honeycomb monolith structure in a reducing atmosphere containing hydrogen where said honeycomb monolith structure is encased in a sintering jig and thereafter removed.

2. A method of sintering a sinterable metal powder honeycomb monolith structure according to claim 1, wherein said sinterable metal powder honeycomb monolith structure is disposed close to said sintering jig during sintering.

3. A method of sintering a sinterable metal powder honeycomb monolith structure according to claim 1, wherein said sinterable metal powder honeycomb monolith structure is located at a position separated from said sintering jig at most by 30 mm during sintering.

4. A method of sintering a sinterable metal powder honeycomb monolith structure according to claim 1, wherein said sinterable metal powder honeycomb monolith structure is located in contact with said sintering jig during sintering.

5. A method of sintering a sinterable metal powder honeycomb monolith structure according to claim 1, wherein a proportion of hydrogen in said reducing atmosphere is 5% by volume or above.

* * * * *